US008965904B2

(12) United States Patent
Dinh et al.

(10) Patent No.: US 8,965,904 B2
(45) Date of Patent: Feb. 24, 2015

(54) APPARATUS AND METHOD FOR INFORMATION ACCESS, SEARCH, RANK AND RETRIEVAL (76) Inventors: Long Van Dinh, Springfield, VA (US); Henry T. Truong, Fairfax, VA (US)

( * ) Notice: Subject to any disclaimer, the term of this patent is extended or adjusted under 35 U.S.C. 154(b) by 0 days.

(21) Appl. No.: 13/426,941

(22) Filed: Mar. 22, 2012

(65) Prior Publication Data
US 2013/0124534 A1    May 16, 2013

Related U.S. Application Data (60) Provisional application No. 61/629,189, filed on Nov. 15, 2011.

(51) Int. Cl.
*G06F 17/30* (2006.01)
(52) U.S. Cl.
CPC ................................. *G06F 17/30696* (2013.01)
USPC ............................ 707/748; 707/736; 707/705
(58) Field of Classification Search
CPC . G06F 17/2785; G06F 17/30; G06F 17/3061; G06F 17/30011; G06F 17/3053; G06F 17/30634; G06F 17/30684; G06F 17/30696
USPC ............ 707/748, 736, 705, 999.001, 999.007
See application file for complete search history.

(56) References Cited

U.S. PATENT DOCUMENTS

| 5,551,018 | A  | * | 8/1996  | Hansen ................................. 1/1 |
| 5,630,114 | A  | * | 5/1997  | Serra et al. ........................... 1/1 |
| 6,161,144 | A  | * | 12/2000 | Michels et al. ................ 709/238 |
| 6,654,742 | B1 | * | 11/2003 | Kobayashi et al. .................... 1/1 |
| 2001/0000356 | A1 | * | 4/2001  | Woods ............................... 707/3 |
| 2002/0161570 | A1 | * | 10/2002 | Loofbourrow et al. ........... 704/4 |
| 2005/0216434 | A1 | * | 9/2005  | Haveliwala et al. .............. 707/1 |
| 2006/0155690 | A1 | * | 7/2006  | Wen et al. .......................... 707/3 |
| 2007/0073540 | A1 | * | 3/2007  | Hirakawa et al. ............. 704/252 |
| 2007/0136243 | A1 | * | 6/2007  | Schorn ............................... 707/3 |
| 2008/0263023 | A1 | * | 10/2008 | Vailaya et al. ..................... 707/5 |
| 2008/0263033 | A1 | * | 10/2008 | Vailaya et al. ..................... 707/6 |
| 2009/0248675 | A1 | * | 10/2009 | Kawabata et al. ................ 707/5 |
| 2011/0296463 | A1 | * | 12/2011 | Suslov ............................. 725/44 |
| 2012/0254161 | A1 | * | 10/2012 | Zhang et al. .................. 707/723 |

\* cited by examiner

*Primary Examiner* — Shiow-Jy Fan (57) ABSTRACT

The invention discloses an apparatus and method for quickly searching and ranking related documents in a database based on user input queries. In operation, a user interface receives a query comprising a plurality of keywords input thereto from a user, the search engine receives the query, retrieves the sorted database which has been sorted in advance, performs a binary search on the sorted database to quickly produce a list of files-of-interest. The ranking engine uses the list of files-of-interest to search corresponding files in the list from the original database, score corresponding files based on a plurality of paragraph scores, where each paragraph score is calculated based on a number of matched keywords and adjacent distances between matched keywords within each paragraph, ranked files based on overall scores are then presented to the user on a display which further comprises an interactive window that allows the user to dynamically reselect a priority of a score among a plurality of scores for re-ranking corresponding files.

25 Claims, 7 Drawing Sheets

APPARATUS AND METHOD FOR INFORMATION ACCESS, SEARCH, RANK AND RETRIEVAL

RELATED APPLICATIONS

This application claims priority from U.S. Provisional Application 61/629,189, filed on Nov. 15, 2011, which is incorporated herein by references in its entirety for all purposes.

BACKGROUND OF THE INVENTION

1. Field of the Invention

The invention relates to a method for quickly searching and ranking related documents in a database based on user input queries.

2. Related Art

A search engine allows input of a plurality of keywords and is capable of finding a document that contains the keywords, where binary searching provides an efficient way to quickly match a keyword in a sorted list such as finding a name of a person in a phonebook. However, the binary searching is not applicable to normal documents where their contents are not sorted. Ranking is a method for scoring documents based on matched keywords and then displaying these documents in an ordered manner according to their score, which would require extensive computations in order to provide an accurate score that would closely related to relevant documents. Since there is a time constraint requirement (i.e, not too long) to present result of relevant documents to a user, there exists a need for a method that provides quick searching and ranking of relevant documents according to user queries.

An object of the invention is to describe a method for scoring relevant files more accurately. Another object is to utilize advantages of binary searching for quickly eliminating unrelated documents and then scoring the remaining documents based on the scores of paragraphs that are most relevant to queries for each document. The scoring process is then used by the ranking process to present the result of ranking documents in an ordered manner from a highest score to a lowest score on a display.

While the below described method would be more suitable to be utilized by entities or organizations such as IEEEs, Patent Offices or the likes, where only a very small portion of a database is added and updated daily, and the whole database is used extensively in a daily basis, the method would be applicable to web crawlers, libraries for searching old archive files that have been sorted in advance, noting that these old archive files would substantially grow in size with time, thereby increase searching time.

In the following, the query, content, word or keyword as described would refer either to a number, character, symbol or a combination thereof. The distance between two keywords would refer to the difference in index locations of the two keywords. For example, the distance between two keywords, "Amy" and "Virginia", in the phrase "Amy is living in Virginia" would be 4.

SUMMARY OF THE INVENTION

In one embodiment, the method comprises a ranking engine for searching, scoring and ranking a list files-of-interest in general. First, the ranking engine uses the list of files-of-interest to retrieve contents of correspondent files-of-interest from the original database, the ranking engine then uses a user query comprising a plurality of keywords to perform a search on the correspondent files-of-interest, and calculating paragraph scores for each file-of-interest, where each paragraph is scored based on a function of the number of matched query-keywords, the number of matched keywords and adjacent distances between matched keywords within the paragraph, where the function would give a higher score for a larger number of matched keywords, a larger number of matched query-keywords, a larger number of adjacent matched keywords and a smaller adjacent distances. An overall score for each file comprising a plurality of scores based on paragraph scores is then obtained for sorting and ranking files, the result is then presented to a user on a display, where an interactive window is further utilized to allow the user to dynamically reselect a priority of a score among a plurality of scores for re-ranking corresponding files, this would give the user advantages of ranking files based on a score that would better suite a particular user need.

It should be noted that with a single search, the interactive window would provide a user many choices to re-rank files without the need of changing his or her search strategy, thereby reducing user times as well as processing times for the whole system. Since a file score is based on paragraph scores which are based on the number of matched query-keywords, the number of matched keywords and adjacent distances between matched keywords within the paragraph, this embodiment would score and rank files more accurately as compared to prior art that score and rank files based only on the number of matched keywords or distances between matched keywords within a file.

However, in order to speed up the ranking process of scoring a very large number of files, a sorted database, which has been sorted in advance, is used for binary searching to quickly eliminate files that did not match a certain number of keywords in the user query.

In a first embodiment, the sorted database is created by eliminating stop words in a file based on a predetermined list of sorted stop words, dividing a file into sub-files if the file size is larger than a predetermined size to avoid sorting a large number of elements, sub-files or files are then numerically and alphabetically sorted, duplicate contents from sorted contents are then eliminated before outputting to create a sorted database comprising a plurality of sorted files. The above steps would create a sorted database where its size is smaller than the size of the original database since stop words (i.e, a, an, the, it, is, etc . . . ) and duplicate words are eliminated in sorted files. Each of the sorted files is then used for matching with user's input query for quickly eliminating unrelated documents, or files, by utilizing the binary searching technique since the content of each file has been numerically and alphabetically sorted in advance.

By quickly eliminating a large number of files that did not match at least one keyword in a user query, a small number of files-of-interest from the original database can be retrieved, searched and scored for each file based on paragraph scores for each file as described above.

While the above searching, scoring and ranking can be performed directly on the original database in a conventional way, the creating of a sorted database proposed in this invention would substantially speed up the processing time due to smaller size of the sorted database and superior quick binary searching time. Although the creation of a sorted database would increase database size, such increase size is not significant because of the elimination of stop words and duplicate/redundant words, high compression ratio of sorted files and cheap memory storages nowadays, and far more advantage than the cost associated with upgrading or increasing computing speeds of processors. Since entities or organizations such as IEEEs, Patent Offices or the likes comprise databases that are used extensively in a daily basis by many users (for example, examiners or researchers), a method that provides quick and accuracy results would substantially saving user times for quickly retrieving relevant documents, thereby result in saving a large amount of operating cost associated with employee working times.

In a second embodiment, since the scoring of a file is relied on matched keywords and substantially relied on matched keywords within a paragraph, the second embodiment is proposed where each paragraph, rather than files or sub-files in the first embodiment, is sorted. Each paragraph score is then scored based on the number of matched keywords within the paragraph and the scoring of a file, derived from paragraph scores, can then be used to eliminate unrelated files more accurately. The files-of-interest obtained in this embodiment is then inputted to the ranking method as described above, where adjacent distances matched keywords within a paragraph is utilized. However, as an option, if the distances between matched keywords within a paragraph are not of great concern, the files-of-interest obtained in the searching engine of this embodiment can be directly ranked on paragraph scores and presented to a user utilizing corresponding original files obtained from the original database.

One advantage of the second embodiment is that keywords within each paragraph have been sorted in advance, thereby a quick binary searching can be used. Another advantage is that the sorting process for sorting paragraphs would be faster than the sorting process for sorting sub-files or files in the first embodiment due to much less elements in each paragraph as compared to that of a sub-file or file.

As mentioned earlier, while the described method is more suitable to be utilized by entities or organizations such as IEEEs, Patent Offices or the likes, one skilled in the art would recognize that the method would applicable to web crawlers, libraries for searching old archive files that have been sorted in advance. Note that the ranking process describes in this invention can also be used to re-rank a list of files-of-interest obtained in current search engines for further improving the ranking performance.

DETAILED DESCRIPTION OF THE INVENTION

Figure 1:
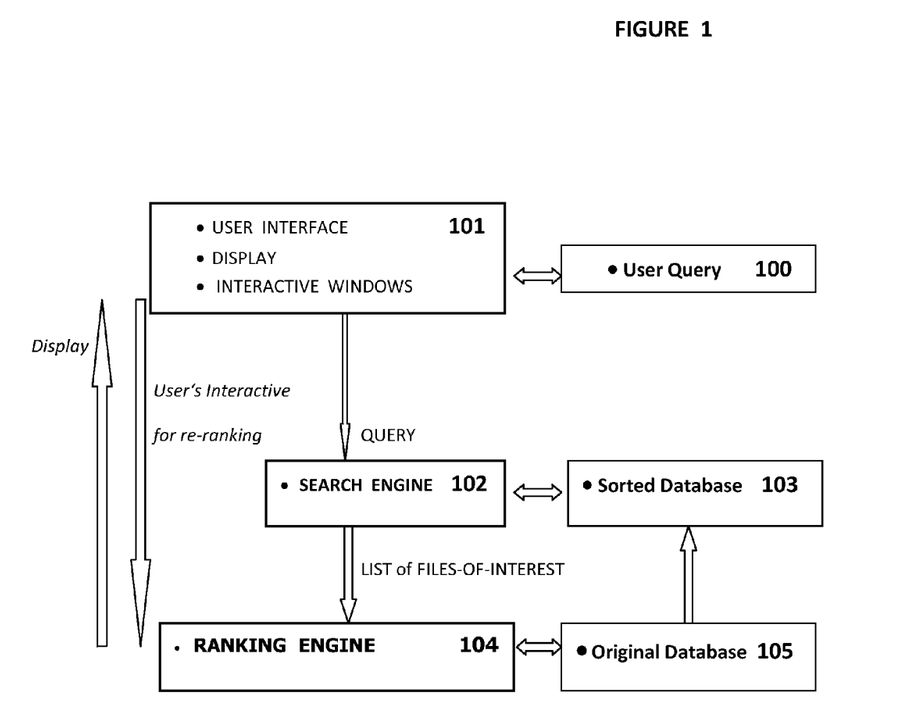
FIG. 1 is a block diagram illustrating the information access, search, rank and retrieval of the invention when utilizing a sorted database.
Figure 5:
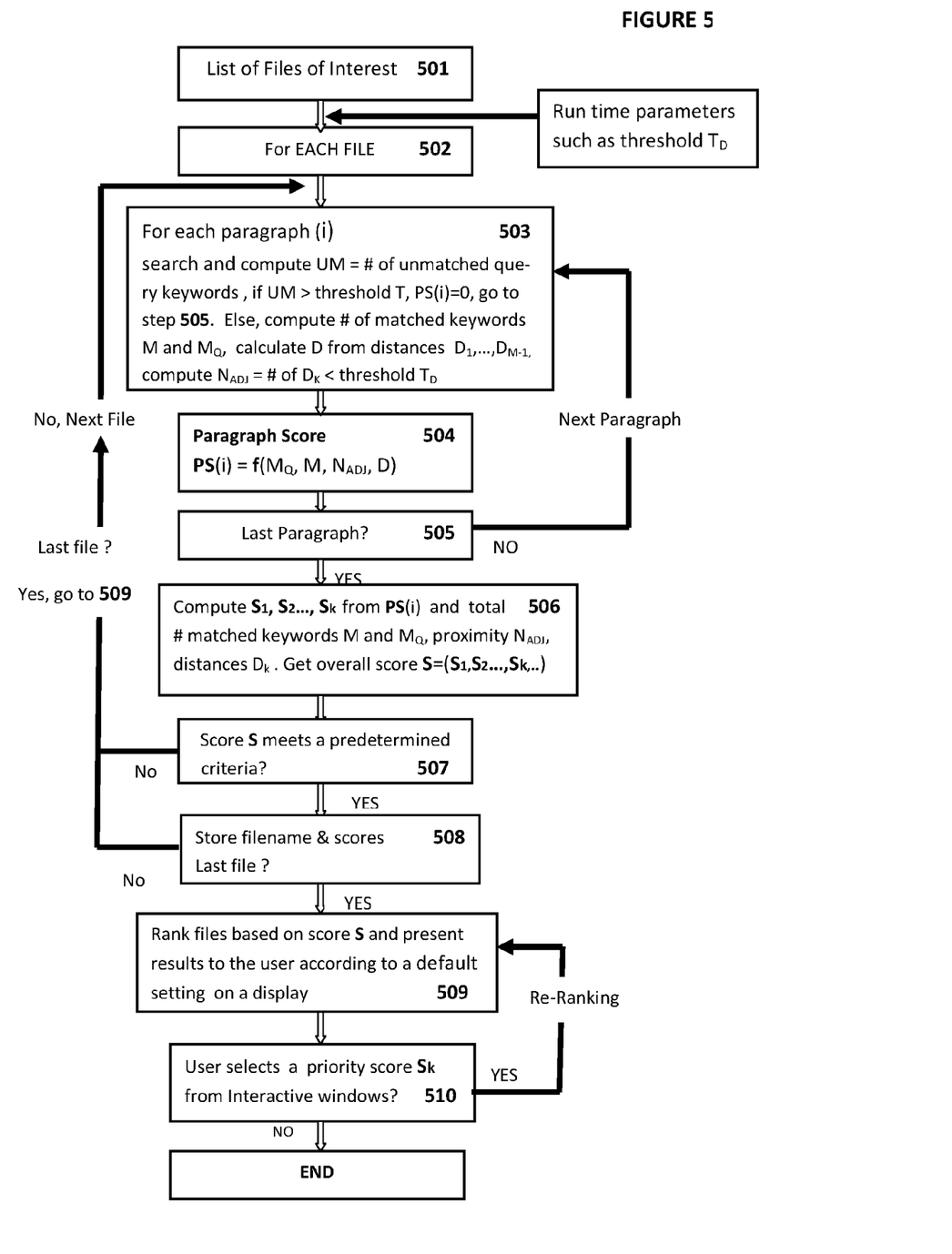
FIG. 5 is a flowchart illustrating a process of searching, scoring and ranking files-of-interest in general.

FIG. 1 is an overall block diagram illustrating the information access, search, rank and retrieval of the invention. The ranking engine 104 in FIG. 1 performs a process of searching, scoring and ranking a list of files-of-interest as illustrated in FIG. 5 and is described hereafter, where the list of files-of-interest, with a broadest interpretation in general, can comprise files either from a single database or from different databases. The list of files-of-interest can be obtained either from a first embodiment or from a second embodiment, or from existing search engines for re-ranking. The list of files-of-interest can also be obtained from any database of interest in general.

File ranking: In FIG. 5, the ranking engine uses the list of files-of-interest to retrieve contents of correspondent files-of-interest from an original database (step 501), the ranking engine uses the query inputted from a user to perform a search on the correspondent files-of-interest, and calculating paragraph scores for each file-of-interest, where each paragraph is scored based on the number of matched keywords (or frequency of occurrences), the number of matched query-keywords, and the distance between matched keywords within the paragraph (steps 502-504). Obviously, the shorter distance between matched keywords within a document, the more likely the document is relevant to the query.

Each paragraph score PS (i) (step 504) can be computed as follow, determine the number of unmatched query-keywords, UM, if UM is greater than a threshold, set paragraph score PS(i) to zero, then go to next paragraph. Otherwise, determine the number of matched keywords (or frequency of occurrences) M and the number of matched query-keywords $M_Q$, where M is greater than or equal to $M_Q$ because the frequency of occurrences of a query-keyword can be occurred more than one in a paragraph, and $M_Q$ is less than or equal to the total number of query-keywords.

determine distances $D_k$ between any two adjacent matched keywords within the paragraph, where $D_k$=the index location of a matched keyword minus the index location of a previous matched keyword, k=1, 2, . . . , M−1.

determine the number of adjacent matched keywords, $N_{ADJ}$, which is the number of distances $D_k$ that are less than a threshold distance $T_D$, $T_D$ is set equal to 3 as an example, to detect the proximity (adjacent or near adjacent) of index locations of matched keywords. Preferably, $T_D$=max of ($T_D$, # of query-keywords in a query) or alternatively, $T_D$ is set as a variable run time parameter, and $N_{ADJ}$=# of $D_k < T_D$. As an example, the distance between two adjacent matched keywords, "Amy" and "Virginia", in the phrase "Amy is living in Virginia" would be 4.

determine a distance D from $D_k$, where D can be computed as

D=max of [$D_k$], or D=min of [$D_k$], or D=square root of sum of $D_k^2$, or preferably, D=sum of $D_k$, this would simply equal to the index location of the last matched keyword minus the index location of the first matched keyword within a paragraph, then each paragraph score PS (i)=f ($M_Q$, M, $N_{ADJ}$, D), where f is a function that would give a higher score for a larger $M_Q$, a larger M, a larger $N_{ADJ}$ and a smaller D.

One example of the function f ($M_Q$, M, $N_{ADJ}$, D) can be modeled as follow f ($M_Q$, M, $N_{ADJ}$, D)=a.$M_Q$+b.$N_{ADJ}$+c.(M−1)/(D+1), where a, b, c are predetermined weighted coefficients. For simplicity, a, b and c are unity coefficients. Obviously, these coefficient values can be optimized via trials-and-errors, or via Artificial Intelligence process.

Further, the total number of $N_{ADJ}$ in a file can also be accumulated for utilization in the scoring process because it is a very effective scoring feature based on proximity of matched keywords for reliably and accurately determining the relevant of a document to a user query comprising a plurality of keywords.

The ranking engine then calculates an overall score S (step 506) comprising a plurality of scores for each file-of-interest, $S=(S_1, S_2, \ldots, S_k)$. Each score $S_k$ can be, but not limited to, the maximum score of the top N paragraph scores PS (i), the average score of the top N paragraph scores PS (i), the score of the special paragraph comprising abstract, title, author names, and publication date, the score based on the total number of matched keywords M in the file, the score based on the total number of near adjacent matched keywords $N_{ADJ}$ in the file, where N is a predetermined number.

By way of an example, let $S_1$ is the maximum paragraph score of the top N paragraph scores PS (i), $S_2$ is the average score of top N paragraph scores PS (i), $S_3$ is the score of the special paragraph such as the paragraph that comprises title, abstract and author names, $S_4$ is the score based on the total number of matched keywords M in the file, $S_5$ is the score based on the total number of adjacent location matched keywords $N_{ADJ}$ in the file, The ranking engine can then further accept or eliminate files (steps 507-508) that does not meet a predetermined criteria based on the plurality of scores $S_k$. For example, eliminating a file if at least one of: $S_1<T_1$, and/or $S_2<T_2$, and/or $S_3<T_3$, where $T_1$, $T_2$, $T_3$ are threshold values determined from the total number of query keywords. For example, $T_1$ is a x % of the total number of query keywords, $T_2$ is a y % of the total number of query keywords, $T_3$ is a z % of the total number of query keywords, where x, y, z are predetermined numbers. The predetermined criteria is set in accordance with whether a soft decision or a hard decision is employed. For examples, accept a file if one of scores is a very high score or all of scores must greater than some certain thresholds (hard decision), or eliminate a file if some or all of scores did not higher than minimum scores (soft decision).

As another embodiment, instead of based on paragraph scores, at least one of the plurality of scores $S_k$ can be calculated based on, the total number of matched keywords M and $M_Q$ within an entire file, a distance D calculated from a plurality of distances $D_k$ for the entire file, and the total number of near adjacent matched keywords $N_{ADJ}$ for the entire file, a file score $S_k=f(M_Q, M, N_{ADJ}, D)=a.M_Q+b.N_{ADJ}+c.(M-1)/(D+1)$.

Preferably, several different sets of values for a, b and c coefficients can be utilized for each file score $S_k$, and where D is the sum of $D_k$.

Next, the ranking engine sorts and ranks the files based on the priority of score $S_k$ (step 509). For example, if score $S_1$ is designated as the top priority, the files are sorted in order of $S_1$ scores, where $S_2$, $S_3$, $S_4$ and $S_5$ scores would serve as a tie-breaker. Similarly, if score $S_2$ is designated as the top priority, the files are sorted in order of $S_2$ scores, where $S_1$, $S_3$, $S_4$ and $S_5$ scores would serve as a tie-breaker. A default setting of priority for scores is desirable, and the priority selection of a new score would place the selected score on top of the list and shift other scores down the list.

Next, the ranking engine presents the result on the display of the user interface according to the default setting (step 509), where each file-of-interest is displayed with the content of the paragraph having a highest score along with the high-lighting of matched keywords.

Default setting: In one embodiment, for all scores $S_k$, the default setting displays files-of-interest having the top m (m=5 as an example) scores for each score $S_k$. This has the advantage of providing a user a quick assess on the relevant of files according to all scores $S_k$ before making a decision of selecting which score $S_k$ would be selected as a top priority score for re-ranking. Further, different colors for each score $S_k$ can also be utilized for high-lighting displayed files, for color distinguishing purpose.

Interactive window: As described earlier, the user then has the option of clicking on an interactive window to reselect a score among a plurality of scores as a top priority score (step 510), the ranking engine then sorts files based on the reselected score and present the new result on the display, ordering files from the highest score to the lowest score of the reselected priority score with the new interactive window showing the current priority setting. The process is then repeated again for each new selection. Obviously, changing values of runtime parameters such as $T_D$ and weighted coefficients a, b, and c is also desirable from the interactive window for re-scoring and then re-ranking files-of-interest.

Web Crawler Applications

Further, not limiting only to the number of matched keywords and distances, when applying to web crawler applications for ranking or re-ranking files-of-interest obtained from current search engines, since the number of users accessed to a document or a website is known from a tracking module, each of the plurality of scores $S_k$ of a file-of-interest can further comprise, but not limited to, one of:

the number of users accessed to a file-of-interest, the number of users accessed to a website that has published a file-of-interest, the most recent publication date of a file-of-interest.

By utilizing the interactive window, a file-of-interest with the most number of accesses and with the latest publication date can optionally be ranked as well. The advantages of an interactive window is that it allows a user to re-ranking files based on the priority of a score that would better suite a particular user need without the need of changing his/her searching strategy.

For examples, when searching a famous person named "John Doe", there would be a lot of files contain the name "John Doe". By simply selecting "date of publication" in the interactive window, the most recent news on "John Doe" would be ranked first. Obviously, ranking the files in a reverse way to display the oldest one is also desirable via incorporating newest or oldest features.

In another example, when searching for a document on "how to cook craw fish", there would be a lot of files contain "craw fish cooking". By simply selecting "number of users accessed" in the interactive window, the document with the most number of users accessed such document would be ranked first. Obviously, this document would likely be a good cook book, rated by the number of readers/users accessed to the document.

In another example, when searching for a document on a research topic, there would be a lot of files relate to the research topic. By simply selecting one of scores relate to the file score such as $N_{ADJ}$ in the interactive window, the documents with the most relevant topic based on $N_{ADJ}$ hits in title, abstract or contents would be ranked according to $N_{ADJ}$ of each document. Similarly, documents can be selected to be ranked according to the maximum paragraph score of each document, or can be selected to be ranked according to the special paragraph score, or the average score of top N paragraph scores.

Database Sorting

As mentioned earlier, in order to speed up the ranking process of scoring a very large number of files, a sorted database, which has been sorted in advance from an original database, is used to quickly eliminate files that did not match a certain number of keywords in the user query. The sorted database is created by eliminating stop words, sorting remain words and then eliminating duplicate/redundant words in a file. Each of the sorted files is then used for matching with user's input query for quickly eliminating unrelated documents, or files, by utilizing the binary searching technique since the content of each file has been numerically and alphabetically sorted in advance.

By quickly eliminating a large number of files that did not match at least one keyword in a user query, a small number of files-of-interest from the original database can be retrieved, searched and scored for each file based on paragraph scores for each file as described above.

It should be noted here that for entities or organizations such as IEEEs, Patent Offices or the likes, databases are used over and over again every day by many users, and only a small portion of new data is created each day. By sorting databases in advance, the saved time on quick retrieving speed when accumulated for many users over day by day as time go on would be substantially large.

Refer back to FIG. 1 again, FIG. 1 is an overall block diagram illustrating the information access, search, rank and retrieval of the invention utilizing a sorted database to quickly identify a list of files-of-interest to be used in the ranking process as described in FIG. 5 above.

In operation, user interface 101 receives a query comprising a plurality of keywords input thereto from a user 100, the search engine 102 receives the query, retrieves the sorted database 103, performs a binary search on the sorted database to produce a list of files-of-interest for inputting to the ranking engine 104. The ranking engine uses the list of files-of-interest to retrieve correspondent files-of-interest from the original database 105, the ranking engine 104 uses the query to perform a search on the correspondent files-of-interest as follow, calculating paragraph scores for each file-of-interest, where each paragraph is scored based on the number of matched query-keywords $M_Q$, the number of matched keywords M, distances $D_k$ between the matched keywords within the paragraph, and the number of near adjacent matched keywords $N_{ADJ}$.

calculating an overall score S comprising a plurality of scores $S_k$ for each file-of-interest, eliminating files that do not meet a predetermined criteria based on the plurality of scores $S_k$, ranking the remaining files-of-interest based on a default setting, presenting the result on the display of the user interface, where each file-of-interest is displayed with the content of the paragraph having a highest score along with the high-lighting of matched keywords, the user then has the option of clicking on an interactive window to reselect a score among a plurality of scores $S_k$ as a top priority score, the ranking engine then sorts files based on the reselected score and present the new result on the display. The ranking process is then repeated again for each new selection. The details of the ranking engine 104 has been described above in FIG. 5.

First Embodiment for Sorting a Database

Figure 2:
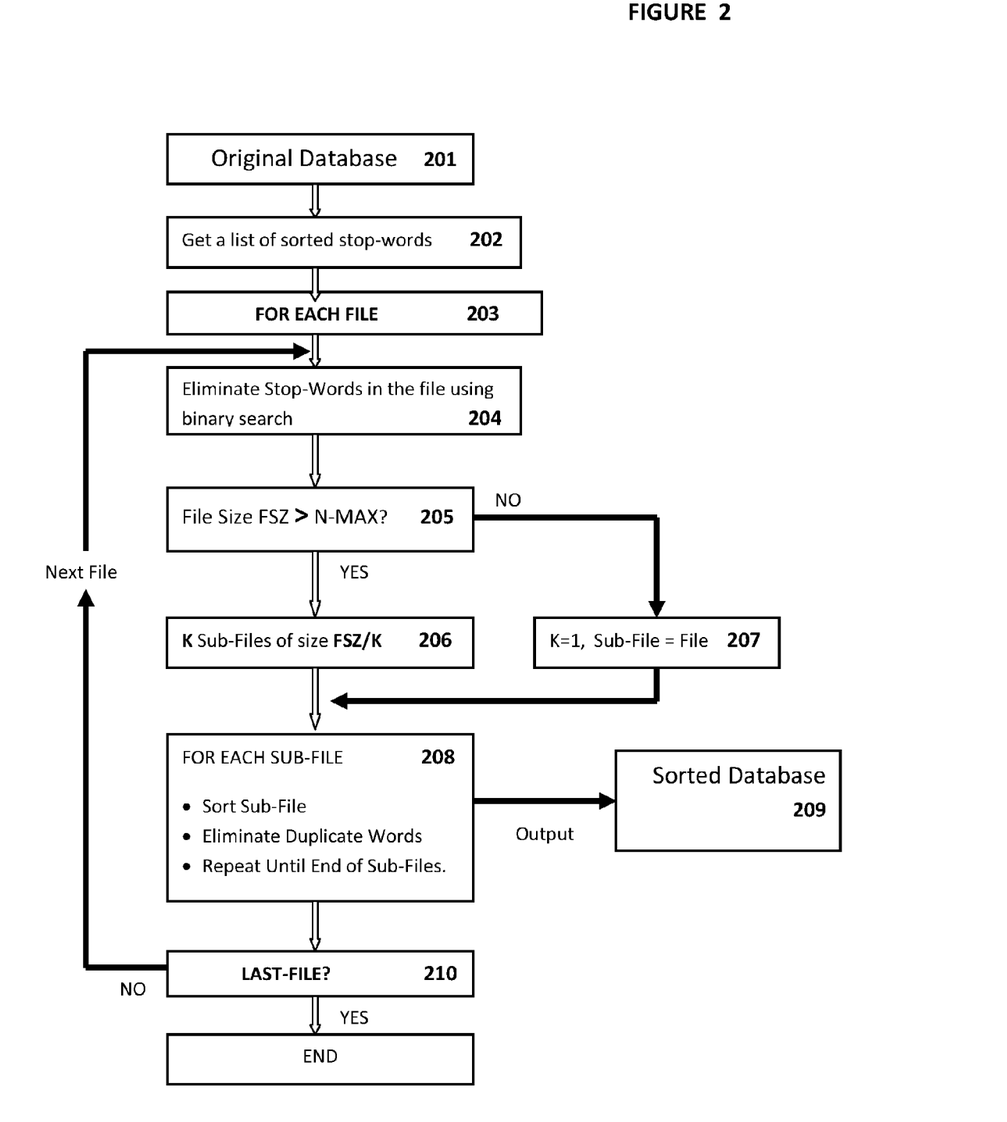
FIG. 2 is a flowchart illustrating a process of creating a sorted database from an original database according to a first embodiment.

FIG. 2 is a flowchart illustrating a process of creating a sorted database from an original database according to the first embodiment.

In FIG. 2, the process starts with,

Step 201: receiving an original database comprising a plurality of files;

Step 202: receiving a list of sorted stop words, where stop words are words that appear frequently in a document without provide much useful information on the subject matter of the document. By way of an example, "a", "an", "the", "it", "of", "is", "are", "in", "to", "for", "that" or the likes are stop words. Note here that the list of stop words is sorted so that a binary search can be made on the list.

Step 203: for each file, eliminating stop words using binary search (step 204);

Check if file size FSZ is larger than a predetermined size NMAX (step 205),

If yes (step 206), determine K=integer (FSZ/NMAX)+1, dividing the file into K sub-files, where each sub-file size=FSZ/K.

If no (step 207), then K=1, sub-file=file,

It should be noted that the above step 206 is performed to prevent sorting a very large file that would take a very long time to finish.

Step 208: For each sub-file, sort the sub-file, eliminating duplicate/redundant words by replacing these words with a single one. This can be done by simply comparing two adjacent words, if they are identical, one of them is popped out. The process is iteratively repeated until none of the two adjacent words are identical.

Step 209: Output sub-files or file to a sorted database,

Step 210: Repeat step 203 until end of files.

As described, the above steps would create a sorted database where its size is smaller than the size of the original database since stop words and duplicate words are eliminated in sorted files. Each of the sorted files is then used for matching with user's input queries for quickly eliminating unrelated documents, or files, as described in FIG. 3 by utilizing the binary searching technique since the content of each file has been numerically and alphabetically sorted in advance.

Figure 3:
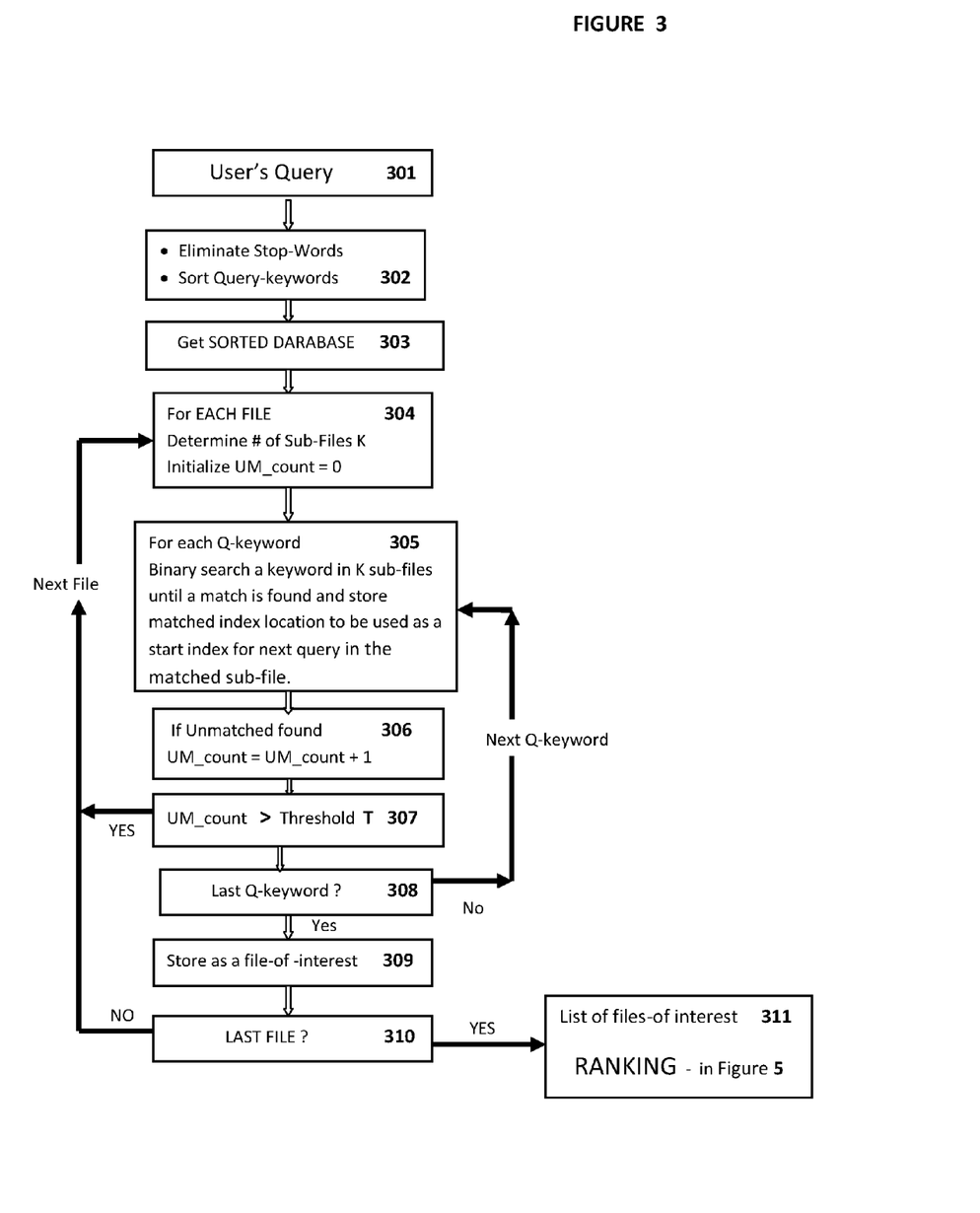
FIG. 3 is a flowchart illustrating a process of eliminating unrelated files and retaining files-of-interest according to the first embodiment.

In the above step 208, the sorting algorithm can employ well known sorting algorithms such as quick sort, merge sort, insertion sort or any other sorting algorithm. However, for further improvement, a modified quick sort that combines the quick sort and the insertion sort can be utilized to improve the sorting process. For example, when using the quick sort algorithm, whenever the number of elements N falls below a certain number (e.g, N is less than 9), an insertion sort is utilized in place of the quick sort. This can be done by simply insert at the first line of the quick sort function (array, N, compare(*)) a line code:

If (N<9) insertion sort (array, N, compare(*)) return;

FIG. 3 is a flowchart illustrating a process of eliminating unrelated files and retaining files-of-interest according to the first embodiment.

Figure 4:
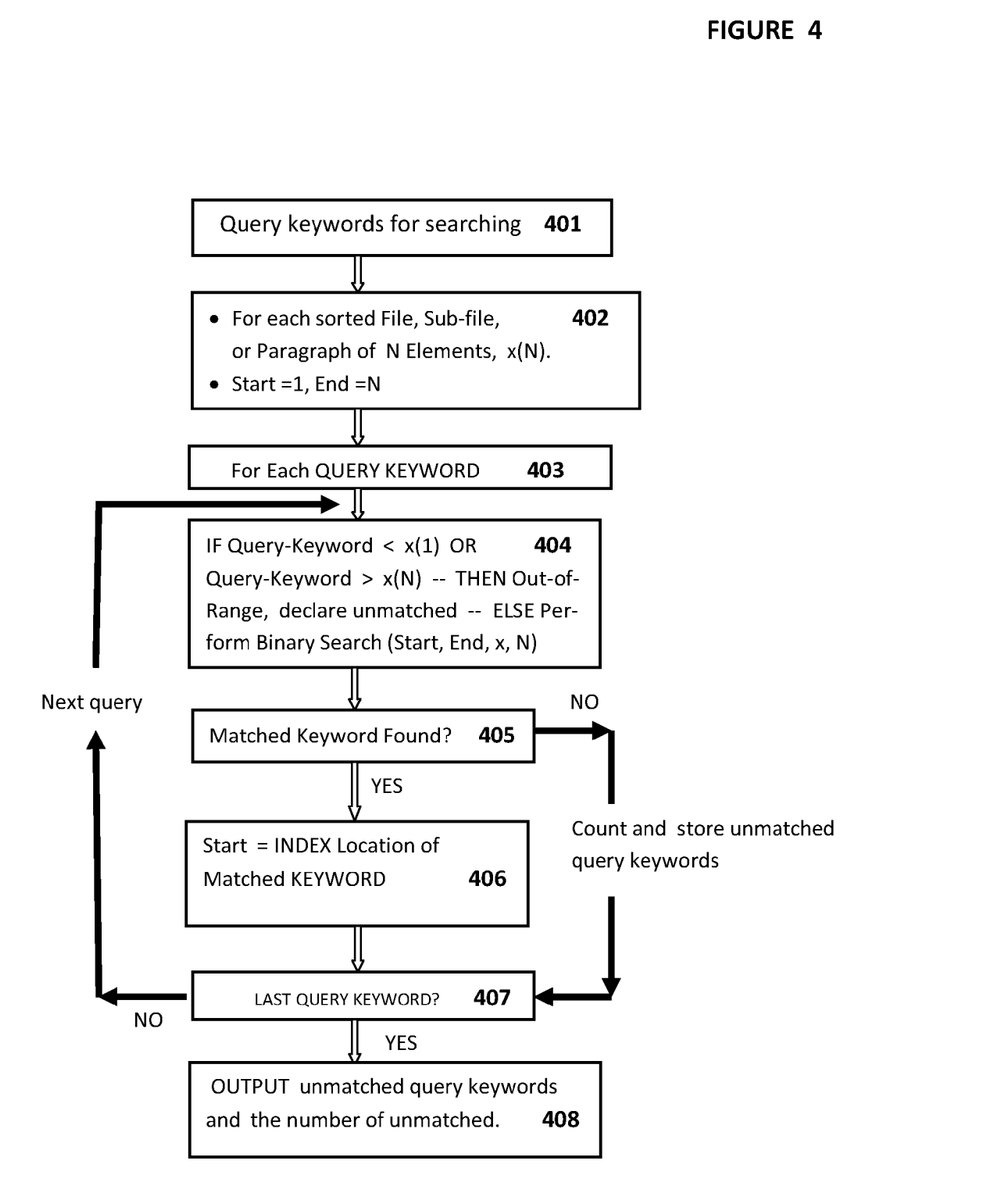
FIG. 4 is a flowchart illustrating the improved binary searching algorithm.

In FIG. 3, the process starts with,

Step 301: receive user query comprising a plurality of keywords,

Step 302: eliminate stop words from user query, sort the query,

Step 303: retrieve the sorted database,

Step 304: for each file, determine the number of sub-files, initialize UM_COUNT=0;

Step 305: for each keyword in the query and for each sub-file, determine the index location of a matched keyword for each sub-file using binary searching algorithm, where the index location of a previous matched keyword would be used as a starting index location for binary searching the next query-keyword (see FIG. 4 for details on how the matched location index of a matched keyword can be used as a start index for subsequence searching the next query-keyword).

Step 306: if unmatched found, UM_COUNT=UM_COUNT+1

Step 307: if UM_COUNT>threshold T, next file (go to step 304).

Step 308: repeat steps 305-307 until end of query (reached last keyword)

Step 309: storing the filename of the current file to a list of files-of-interest.

Step 310: If end of files, output list of files-of-interest to the ranking process (step 311) as described in FIG. 5.

In the above step 307, if the number of unmatched keyword is greater than a threshold T, the file is eliminated. For a hard decision, the value of the threshold T can be set equal to zero for maximizing the number of eliminated files. It should be noted that since the number of files-of-interest is just a small portion of a database, counting the number of unmatched keywords for eliminating a file would be quicker than counting the number of matched keywords for accepting a file.

The improved binary searching as described in step 305 above is illustrated in more details in FIG. 4.

FIG. 4 is a flowchart illustrating the improved binary searching algorithm for matching a plurality of query keywords to each paragraph, sub-file or file X of N elements.

In FIG. 4, initially, the start index is set equal to the first index, the first keyword of the query is then compared to the start index keyword and the last index keyword of a sub-file X comprising N elements, if out-of-range (i.e, query keyword<X[1] or query keyword>X[N]), declare unmatched. Otherwise, a conventional binary searching is performed to find a match in the sub-file X. If a match is found, the index location of the match is used as a start index for binary searching for the next keyword of the query, and the process is iteratively performed until the last keyword of the query has been reached. By using the index location of a previously matched query keyword as a start index for the next query keyword, the search range is narrowed down for each subsequence query keyword since these query keywords have been sorted in advance. This would speed up the searching time as compared to the conventional way (less than $\log_2 N$ versus N comparisons, where N is the number of elements or keywords in a file or sub-file).

As mentioned earlier, by quickly eliminating a large number of files that did not match at least one keyword in a user query, a small number of files-of-interest from the original database can be retrieved, searched and scored for each file based on paragraph scores for each file as described in FIG. 5, where each paragraph would be scored based on the number of matched query-keywords, the number of matched keywords (frequency of occurrences) and proximity distances between matched keywords within each paragraph.

Second Embodiment for Sorting a Database

Since the scoring of a file is relied on matched keywords and substantially relied on matched keywords within a paragraph, a second embodiment is proposed where each paragraph, rather than files or sub-files in the first embodiment, is sorted.

Figure 6:
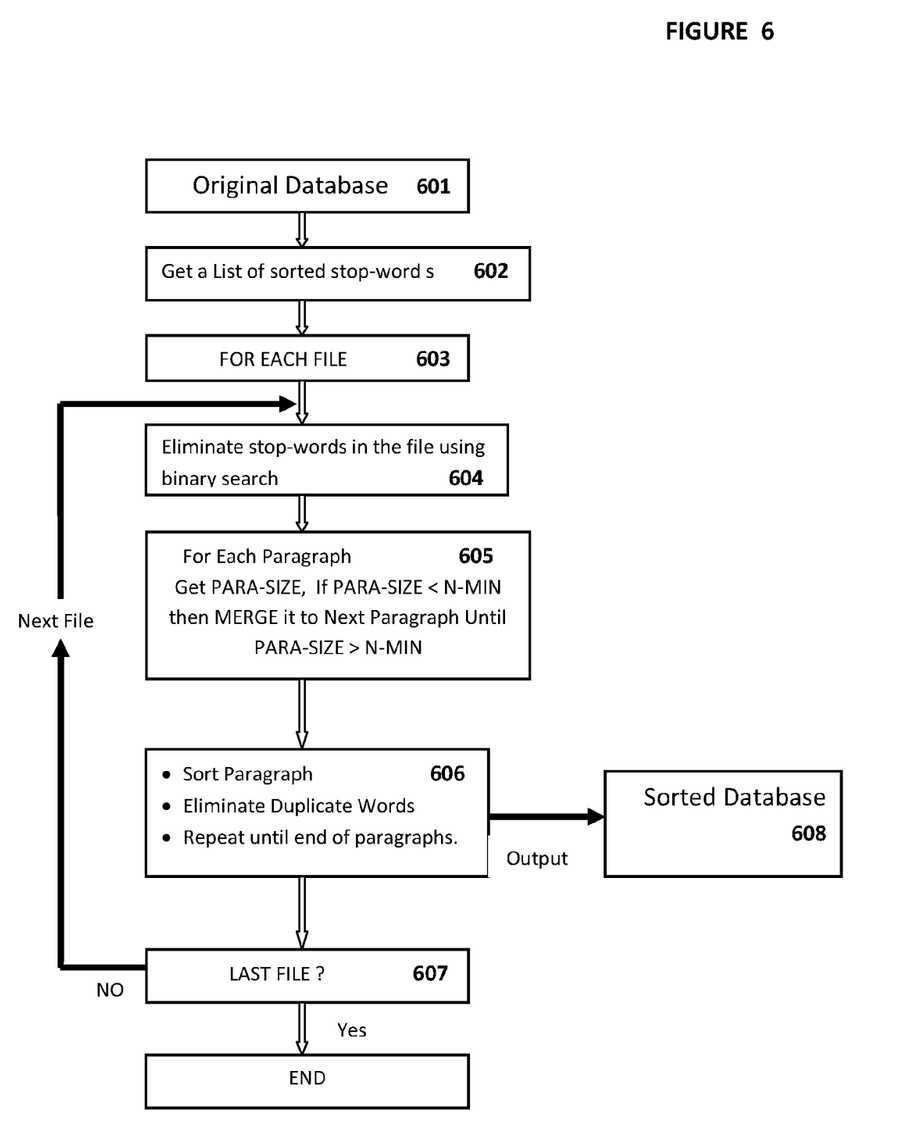
FIG. 6 is a flowchart illustrating a process of creating a sorted database from an original database according to a second embodiment.

FIG. 6 is a flowchart illustrating a process of creating a sorted database from an original database according to the second embodiment.

In FIG. 6, the process of eliminating stop words and duplicate words for each paragraph is similar to the process of eliminating stop words and duplicate words for each sub-file in FIG. 2. However, in FIG. 6, if the current paragraph size is less than a predetermined number NMIN, next paragraphs are merged into the current paragraph until its size is larger than NMIN. The merging process is made to avoid process a paragraph with too few words (e.g, less than 5).

Figure 7:
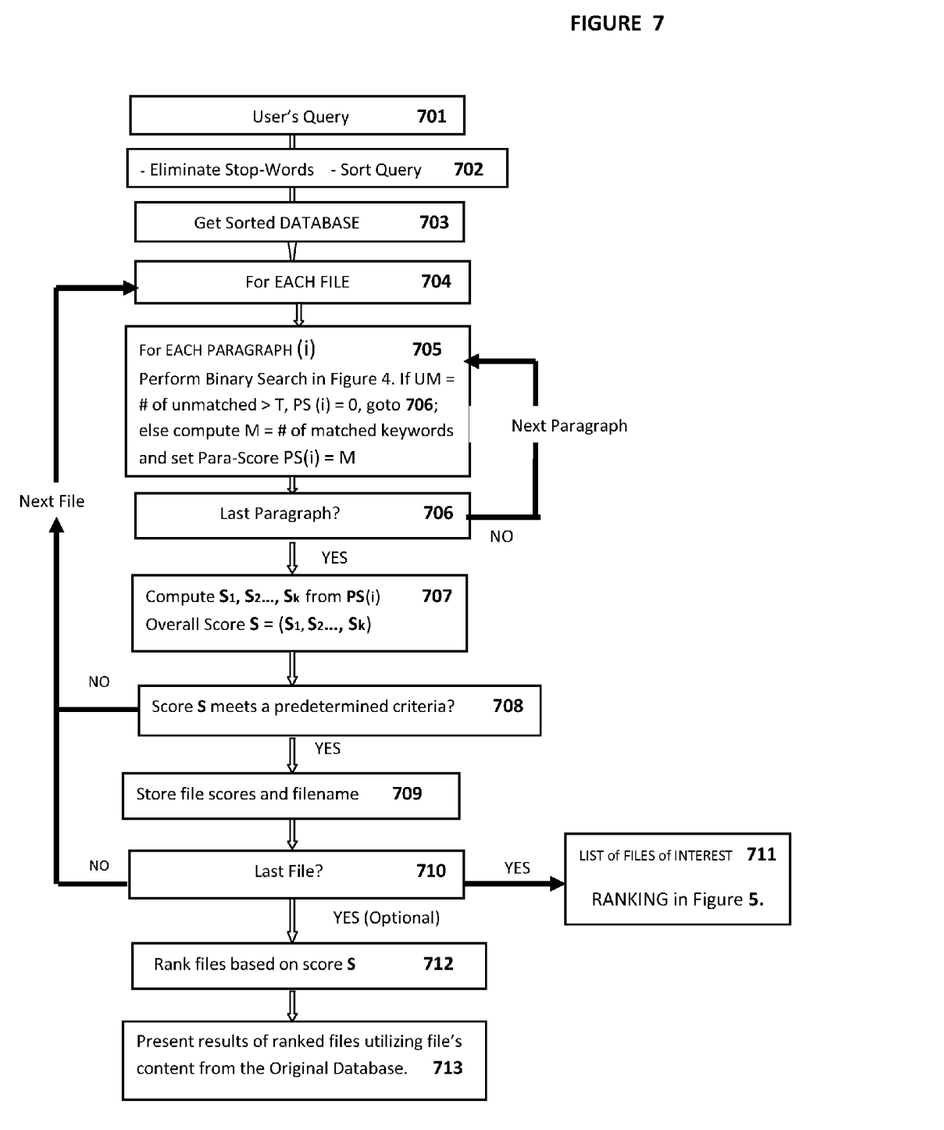
FIG. 7 is a flowchart illustrating a process of eliminating unrelated files and retaining files-of-interest according to the second embodiment.

FIG. 7 is a flowchart illustrating a process of eliminating unrelated files and retaining files-of-interest according to the second embodiment.

In FIG. 7, the process of binary searching for each paragraph (steps 701-705) is similar to the process of binary searching for each sub-file in FIG. 3, utilizing binary searching algorithm in FIG. 4. However, in FIG. 7, the number (frequency of occurrences) of matched keywords M is determined for each paragraph, and each paragraph score PS (i) is set equal to M, PS(i)=M, where M would be equal to $M_Q$ for this case because redundant keywords are already eliminated from sorted paragraphs.

In step 706, the search engine then calculates an overall score S comprising a plurality of scores for each file, $S=(S_1, S_2, \ldots, S_k)$ in the similar way as described in FIG. 5 for the ranking engine. Each score can be, but not limited to, the maximum score of the top N paragraph scores, the average score of the top N paragraph scores, the score of the special paragraph comprising abstract, title, author names, publication date, or the score based on the total number of matched keywords in the file.

Next, step 707, the search engine eliminating files that does not meet a predetermined criteria based on the plurality of scores $S_k$ as described FIG. 5. For example, eliminating a file if at least one of: $S_1<T_1'$, and/or $S_2<T_2'$, and/or $S_3<T_3'$, where $T_1', T_2', T_3'$ are threshold values determined from the number of query keywords, which are similar to thresholds $T_1, T_2, T_3$ of the ranking process in FIG. 5.

Next, step 708, non-eliminated filename is stored to a list of files-of-interest.

Next, step 709, if end of files, output the list of files-of-interest to the Ranking process in FIG. 5.

The main different between the second embodiment and the first embodiment is that, in the second embodiment, the number of matched keywords within a paragraph must greater than a threshold value determined from the number of query-keywords for at least one paragraph (for example, at least one score PS(i)=M must greater than x % of the number of query keywords).

Next, the files-of-interest obtained in the second embodiment is then inputted to the ranking method as described above in FIG. 5, where the method for calculating an overall score $S=(S_1, S_2, \ldots, S_k)$ for each file would be the same as described earlier in FIG. 5.

However, as an option for another embodiment, if the distances $D_k$ between matched keywords within a paragraph is not of great concern, the files-of-interest obtained in the searching engine of the second embodiment can be directly ranked based on score $S=(S_1, S_2, \ldots, S_k)$, where only the number of matched keywords M within a paragraph is utilized for each paragraph score, and the result is presented to a user utilizing corresponding original files obtained from the original database.

One advantage of the second embodiment should be noted is that the sorting process for sorting paragraphs would be faster than the sorting process for sorting sub-files or files in the first embodiment due to much less elements in each paragraph as compared to that of a sub-file or file. By setting the number of elements for each paragraph approximately equal to the number of elements for each sub-file, the two embodiments would work similar.

While the arrangement of different embodiments has been described as set forth above, it is to be understood that the invention is not limited to the above descriptions. As an example, many obvious variations can be made such as checking spellings of a query-keyword before searching, searching also synonyms, alternative forms and plural form of a query-keyword.

It should be noted that the subject matter or methods described above can be implemented in hardware, in software, or in both hardware and software. In certain implementations, the exemplary system and related methods may be described in the general context of computer-executable instructions, such as program modules, being executed by a computer. The computer typically includes a variety of computer-readable media. Computer-readable media can be any available media that can be accessed by the computer and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other non-transitory medium which can be used to store the desired information and which can be accessed by the computer.

In summary, the invention describes a method for quickly searching and ranking a list of files-of-interest, where a file score is reliably and accurately determined based on the number of matched query-keywords, the number of matched keywords (or frequency of occurrences), the number of adjacent or near adjacent matched keywords, and proximity distances between matched keywords within a paragraph for a plurality of paragraphs in the file. The invention further provides advantages of an interactive window that would allow a user to re-ranking files based on the priority of a score that would better suite a particular user need without the need of changing searching strategy. Since one skilled in the art would recognize that there are many obvious variations that can be made to the above described embodiments, it is to be understood that the invention is not limited to the described embodiments except as defined in the following claims.

What is claimed is:

1. A computer implemented method for searching and ranking a list of files-of-interest, comprising:
   receiving an user input query comprising a plurality of keywords;
   searching and scoring said files-of-interest, wherein each said file-of-interest comprises a plurality of scores, wherein at least two of said plurality of scores are calculated based on a plurality of paragraph scores, and
   wherein each paragraph score is calculated based on a total number of matched keywords, a number of unique matched query-keywords, and a plurality of distances between any two adjacent matched keywords within each paragraph;
   ranking said files-of-interest according to said plurality of scores and based on both score values and priority levels assigned to each of said plurality of scores, in response to the score values of at least two current compared scores are equal, the score values of at least two respective scores with lower priority are used for ranking;
   presenting results of said ranking to the user;
   providing an interactive window that allows a user to dynamically reassign the priority levels of said plurality of scores;
   re-ranking said files-of-interest based on both score values and reassigned priority levels of said plurality of scores of said files-of-interest; and
   presenting results of said re-ranking to the user.

2. The method according to claim 1, wherein at least one of said plurality of scores comprises a number of distances less than a threshold distance; and said priority levels are initially set according to a default setting.

3. The method according to claim 2, wherein for all of said plurality of scores, the default setting displays files-of-interest having top M scores for each of said plurality of scores, where M is a predetermined number.

4. The method according to claim 1, wherein at least two of said plurality of scores of each file-of-interest are calculated based on a combination of at least one of: a total number of matched keywords and a number of matched query-keywords in the file of each file-of-interest, a plurality of distances between any two adjacent matched keywords in the file, a distance calculated from the plurality of distances, and a total number of distances less than a threshold distance within the file; and
   at least one of said plurality of scores is calculated based on a combination of at least one of: a number of users accessed the file, a number of users accessed a website that has published the file, and a publication date of the file.

5. The method according to claim 1, wherein said searching and scoring said files-of-interest further comprises:
   for each file in said list:
   a—determine a total number of matched keywords occurred in the file,
   b—determine a number of unique matched query-keywords in the file,
   c—determine a plurality of distances between matched keywords in the file,
   d—determine a total number of distances that are less than a threshold distance within the file.

6. The method according to claim 5, wherein at least one of said plurality of scores is calculated based on said number of unique matched query-keywords, said number of matched keyword, said total number of distances that are less than a threshold distance within the file and a distance calculated from said plurality of distances.

7. The method according to claim 6, wherein said calculated distance is at least one of: a distance between a first matched keyword and a last matched keyword, a shortest distance between two adjacent matched keywords, a largest distance between two adjacent matched keywords, or a square root of sum of square of distances between any two adjacent matched keywords.

8. The method according to claim 5 wherein said threshold distance is set to detect the proximity of index locations of matched keywords.

9. The method according to claim 5 further comprises: at least two of said plurality of scores of each said file-of-interest is calculated based on a combination of at least one of:
   the total number of matched keywords in the file of each said file-of-interest,
   the number of unique matched query-keywords in the file of each said file-of-interest,
   the plurality of distances between any two adjacent matched keywords in the file,
   a distance calculated from the plurality of distances, the total number of distances less than the threshold distance within the file, a number of users accessed the file, a number of users accessed a website that has published the file, and a publication date of the file.

10. A computer implemented method for searching and ranking a list of files-of-interest, comprising:

receiving an user input query comprising a plurality of keywords;

for each file in the list:
- a—determine a number of unmatched query-keywords during searching each paragraph of the file, and if the number of unmatched query-keywords is greater than a portion of a total number of keywords in the query, set the paragraph score to zero and skip to a next paragraph,
- b—determine a number of unique matched query-keywords for each paragraph of the file,
- c—determine a number of matched keywords occurred in each paragraph of the file,
- d—determine a plurality of distances between matched keywords within each paragraph,
- e—determine a number of distances less than a threshold distance within each paragraph,
- f—determine a plurality of paragraph scores, wherein each paragraph score is calculated based on said number of matched keywords, said number of unique matched query-keywords, a distance from said plurality of distances, and said number of distances less than said threshold distance,
- g—determine an overall score based on at least two of said plurality of paragraph scores, wherein each overall score comprises a plurality of scores;

sorting and ranking said files based on the overall scores of said files; and presenting results of said ranking to the user, wherein said sorting and ranking is based on both priority levels and score values of said plurality of scores, said priority levels of said plurality of scores are initially set according to a default setting, in response to the score values of at least two current compared scores are equal, the score values of at least two respective scores with lower priority are used for ranking.

11. The method according to claim 10, wherein said presenting displays each file with content of the paragraph having a highest score along with the high-lighting of matched keywords.

12. The method according to claim 10, wherein said presenting further comprises an interactive window that allows a user to dynamically reselect a priority of a score among said plurality of scores for re-ranking said files.

13. The method according to claim 10, wherein said distance is calculated based on at least one of: a distance between a first matched keyword and a last matched keyword, a shortest distance between two adjacent matched keywords, a largest distance between two adjacent matched keywords, or a square root of sum of square of distances between two adjacent matched keywords within each paragraph.

14. The method according to claim 10, further comprising: eliminating a file if at least one of said plurality of scores of the file does not meet a predetermined criteria.

15. The method according to claim 10, wherein at least one of said plurality of scores of each file comprises a combination of at least two of:
- a highest paragraph score;
- an average score of top N paragraph scores, where N is a predetermined number;
- a special paragraph score;
- a total number of unique matched query-keywords in the file;
- a total number of matched keywords in the file;
- a total number of distances less than the threshold distance within the file;
- a distance between a first matched keyword and a last matched keyword within the file.

16. A computer implemented method for searching and ranking, comprising:

receiving an user input query comprising a plurality of keywords;

retrieving a sorted database comprising a plurality of sorted files, wherein each sorted file is a sorted content of its respective corresponding original file;

searching said sorted database based on said query to produce a list of files-of-interest;

retrieving corresponding original files from an original database based on said list of files-of-interest;

obtaining a plurality of scores for each file of said list of files-of-interest, wherein at least two of said plurality of scores are calculated based on a plurality of paragraph scores, and wherein each paragraph score is calculated based on a total number of matched keywords, a number of unique matched query-keywords, and a plurality of distances between any two adjacent matched keywords within each paragraph;

searching and scoring said corresponding original files;

ranking said respective corresponding files based on a default setting of priority levels of scores and score values of each said respective corresponding original file, in response to the score values of at least two current compared scores are equal, the score values of at least two respective scores with lower priority are used for ranking; and presenting results of said ranking to the user.

17. The method according to claim 16, wherein stop words are eliminated from said plurality of sorted files based on a list of sorted stop words, duplicate contents or identical words within each of said sorted files are eliminated and replaced with a single one, and a binary searching algorithm is used for searching said sorted files.

18. The method according to claim 17, wherein said binary searching is an improved binary searching algorithm, where the query is sorted, and an index location of a previously matched keyword is used as a start searching index for subsequence keywords of the query.

19. The method according to claim 16, wherein at least one paragraph score is further calculated based on a number of distances less than a threshold distance.

20. The method according to claim 16, wherein at least one of said plurality of scores is calculated based on at least one of: a total number of matched query-keywords in a file, a total number of matched keywords in a file, a total number of distances less than a threshold distance in the file, a highest paragraph score, an average score of top N paragraph scores, or a special paragraph score, where N is a predetermined number.

21. The method according to claim 16, wherein the scoring of said corresponding files comprise a plurality of scores for each of said corresponding files; and said presenting further comprises an interactive window that allows a user to dynamically reselect the priority of a score among said plurality of scores for re-ranking said corresponding files.

22. The method according to claim 16, wherein said searching said sorted database comprises:

for each file of said sorted files:
a—determine a number of unmatched keywords in the query;
b—if the number of unmatched keywords is greater than a predetermined number, skip the current file and go to next file;
c—if the number of unmatched keywords is not greater than said predetermined number, storing the filename of the current file to a list of files-of-interest and go to next file.

23. The method according to claim 22, wherein the query is sorted after eliminating stop words from the query, and the determining in step (a) is performed by utilizing an improved binary searching algorithm, wherein an index location of a previously matched keyword is used as a start searching index for subsequence keywords of the query.

24. The method according to claim 16, wherein said searching said sorted database comprises:

for each file of said sorted files:
a—determine a number of unmatched keywords during searching each paragraph of the file, and if the number of unmatched keywords is greater than a portion of a total number of keywords, set the paragraph score to zero and skip to a next paragraph,
b—determine a number of matched keywords for each paragraph of the file,
c—determine a plurality of paragraph scores, wherein each said paragraph score is calculated based on said number of matched keywords, and
d—determine an overall score based on said plurality of paragraph scores, wherein said overall score comprises a plurality of scores,
e—if said overall score does not meet a predetermined criteria, skip the current file and go to next file, and
f—if said overall score meets said predetermined criteria, storing the filename of the current file to a list of files-of-interest and go to next file.

25. A computer implemented method for ranking and re-ranking a list of files-of-interest, comprising:

receiving a plurality of paragraph scores for each file of said files-of-interest;
obtaining a plurality of scores for each file of said files-of-interest, where at least two of said plurality of scores are calculated based on said plurality of paragraph scores, and wherein each paragraph score is calculated based on a total number of matched keywords, a number of unique matched query-keywords, and a plurality of distances between any two adjacent matched keywords within each paragraph;
determining priority levels of said plurality of scores according to a default setting of said plurality of scores;
ranking said files-of-interest based on the score values and priority levels of said plurality of scores of said files-of-interest, in response to the score values of at least two current compared scores are equal, the score values of at least two respective scores with lower priority are used for ranking;
presenting results of said ranking on a display;
using an interactive window to reassign the priority levels of said plurality of scores;
re-ranking said files-of-interest based on both the score values and reassigned priority levels of said plurality of scores of said files-of-interest; and
presenting results of said re-ranking on the display.

* * * * *